Patented Sept. 5, 1944

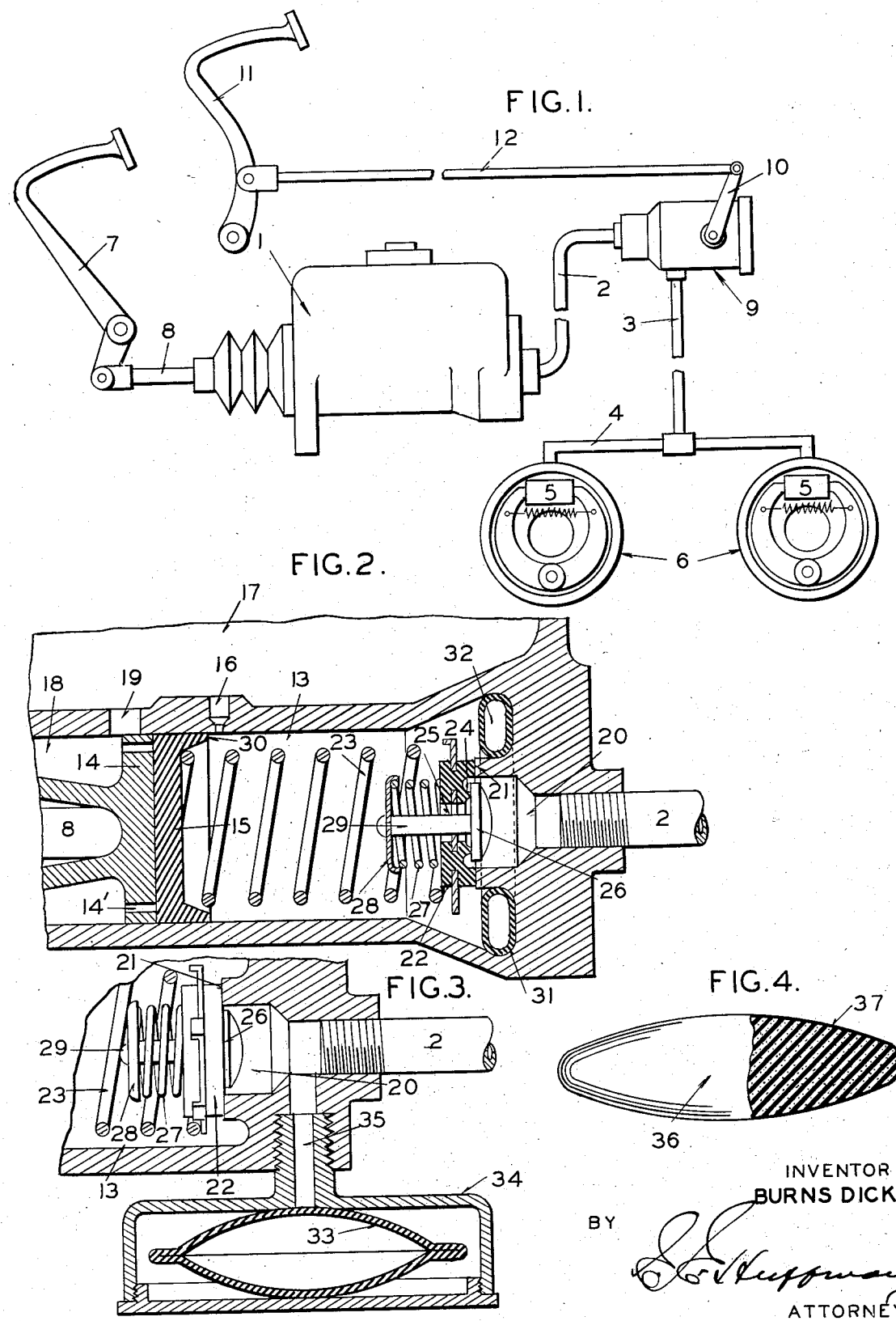

2,357,386

UNITED STATES PATENT OFFICE 2,357,386

HYDRAULIC ACTUATING SYSTEM

Burns Dick, Ferguson, Mo., assignor to Wagner Electric Corporation, St. Louis, Mo., a corporation of Delaware Application December 14, 1942, Serial No. 468,914

10 Claims. (Cl. 60—54.5)

My invention relates to hydraulic actuating systems and more particularly to the kind employed in actuating brakes and having a master cylinder device as the means for developing pressure.

One of the objects of my invention is to provide a hydraulic actuating system of the kind referred to with means which will result in a longer operating life of the sealing cup of the master cylinder device.

Another object of my invention is to embody in a hydraulic actuating system an improved yieldable means which will be acted upon by the liquid when placed under pressure and wherein the amount of yield will be the greatest at low liquid pressures and progressively decrease as the pressure of the liquid increases.

A more specific object of my invention is to embody in a hydraulic actuating system a yieldable means in the form of a predetermined volume of compressible fluid such as air and being confined within a sealed chamber having a flexible wall subject to liquid pressure.

Other objects of my invention will become apparent from the following description taken in connection with the accompanying drawings in which Figure 1 is a schematic view showing a hydraulic brake actuating system in which my invention is embodied; Figure 2 is an enlarged sectional view of a part of the master cylinder device showing a structure embodying the invention; Figure 3 is a sectional view showing another manner in which the invention may be embodied in the actuating system; and Figure 4 is a view of a cellular rubber member that may be employed as the yieldable means in the system.

Referring to the drawing in detail and first to Figure 1, there is schematically disclosed the well-known hydraulic brake actuating system comprising a master cylinder device 1 having its outlet connected, by means of conduits 2, 3, and 4, to the fluid motors 5 for actuating the brake shoes of the brake assemblies 6. The master cylinder device is actuated by a brake pedal 7 connected to operate the piston of the master cylinder device by a rod 8. Interposed between conduits 2 and 3 is a fluid pressure holding valve 9 whereby fluid under pressure may be trapped in the fluid motors 5 to hold the brakes applied. This valve may be of any suitable construction but is preferably of the type shown in Freeman Patent No. 2,030,288, issued February 11, 1936. The valve is controlled by a lever 10 which is connected to the clutch pedal 11 by a rod 12. When the clutch pedal is in clutch engaging position the valve will be ineffective to trap fluid and when the clutch is in clutch-disengaged position, fluid pressure may be trapped to thus hold the brakes applied, as, for example, when the vehicle is stopped on an inclined highway. Under such conditions the vehicle would be prevented from rolling rearwardly without the necessity of holding the operator's foot on the brake pedal. When the clutch pedal is released to permit the re-engagement of the clutch, the valve will be opened and the brakes released.

As shown in Figure 2, the master cylinder device comprises a cylinder 13 in which is reciprocable a piston 14 actuated by the previously mentioned rod 8. The piston is provided with a packing cup 15 and when the piston and packing cup are in their normally retracted or inoperative positions, the cup will uncover a porthole 16 which permits the interchange of fluid between the portion of cylinder 13 ahead of the piston and the reservoir 17 above the cylinder. Thus it is seen that when the piston is inoperative, expansion and contraction of the fluid in the system is permitted by the porthole 16. At the rear of the head of piston 14 there is a chamber 18 which is constantly filled with fluid from the reservoir by way of the opening 19. By having this body of fluid at the rear of the piston, air cannot be drawn past the piston during its retracting movement in the event that subatmospheric pressure should tend to develop in the system. To facilitate the flow of fluid past the piston openings 14' are provided through the head of the piston. Thus fluid can freely pass the piston from chamber 18 and enter the cylinder ahead of the cup, the cup collapsing slightly to permit fluid to slip past its periphery.

The outlet opening 20 at the forward end of cylinder 13 has a valve seat 21 associated therewith with which cooperates an annular rubber valve element 22 normally held upon the seat by a spring 23 interposed between the piston and said valve element. This spring 23 is the retracting spring for the piston and aids in returning the piston to its inoperative position when the foot is removed from the brake pedal. The valve element 22 is provided with a valve seat 24 around its opening 25 and cooperating with this valve seat is a valve element 26 normally biased to a seated position by a very light spring 27 interposed between the valve element 22 and a washer 28 carried on the end of a valve stem 29 extending through opening 25. This valve mechanism just described is of well-known construction and is employed to maintain a slight positive pressure in the fluid in conduits 2, 3, and 4 and the fluid motors 5 when the piston is in retracted position. This slight pressure, however, is not sufficient to apply the brake shoes against the action of their retracting springs. Fluid under pressure can flow freely through the opening 25 when pressure is developed by piston 14 as valve element 26 will readily unseat. When the piston is permitted to be retracted, fluid will return to cylinder 13 by unseating valve element 22. However, when the fluid pressure in conduits 2, 3, and 4 and the fluid motors 5 drops to such a low value that it can no longer unseat the valve element 22 against the action of the retracting spring 23, no more fluid will return to cylinder 13 and fluid will be maintained in the conduits and the fluid motors under the desired pressure.

All the structure in connection with the hydraulic actuating system just described is wellknown as is also its operation. In such a system trouble has been experienced with the piston packing cup 15, particularly the cutting thereof by porthole 16 as it passes thereover. Since the liquid in the system is non-compressible, it is obvious that as soon as the forward edge 30 of the lip of the cup passes the port, pressure will begin to build up immediately. This pressure will tend to force the material of the cup, which is of rubber or like material, through the hole and cutting or chafing will take place as the cup continues to move forwardly.

In accordance with my invention I desire to prevent, as much as possible, the occurrence of this cup cutting or chafing and to accomplish this, I embody in the hydraulic system a chamber having a readily yieldable wall within which air or similar compressible fluid is confined. As shown in Figure 2, this chamber is formed by an annular tube 31 of rubber or equivalent material, thus forming an annular chamber 32 in which air under atmospheric pressure is contained. The tube is shown as being positioned at the forward end of cylinder 13 in surrounding relation to outlet 20. The rubber walls forming the chamber are very thin and thus readily yieldable to permit the air in the chamber to be compressed. The size of the chamber is so calculated that the amount of air will not cause inefficient operation of the system by making the system too "springy" so that the desired maximum pressure cannot be transmitted to the fluid motors to operate the brakes by use of the available piston and pedal travel.

With this volume of air confined in a sealed chamber in the system it is apparent that when the cup just passes the porthole 16 hydraulic pressure cannot be built up rapidly since the noncompressible liquid in the system now acts against a compressible medium. Therefore, the cup will travel some distance past the porthole before high pressures begin to develop. When these high pressures do begin to develop they cannot act to force the lip of the cup into a hole because the body of the cup is opposite the hole and it cannot be readily pushed into the hole. The volume of confined air will decrease inversely to the increase of the pressure of the liquid. Thus the greatest decrease in the volume of the confined air (greatest yield) will be during the building up of the lower hydraulic pressures. The forward edge of the lip of the cup will, therefore, move a considerable distance beyond the porthole before any high pressures are developed.

The employment of a body of confined air in the system is also very useful in prolonging the life of the packing cup 25 when a holding valve such as valve 9 is employed. With such a valve in the system the vehicle operator has a tendency to re-operate the master cylinder device after fluid under pressure has once been trapped in the fluid motors and the pedal released. With a usual hydraulic system (no body of confined air therein) there will be no yield whatsoever upon re-operation of the master cylinder as would be the case when the brakes are applied from released position (such yield being present due to the retracting springs of the brake shoes and the yielding of some of the conduits made of rubber hose). Thus with valve 9 operative there will be extremely high pressures developed as soon as the lip of the cup passes the porthole. These high pressures will force more of the cup into the porthole and consequently cause greater damage. By having a body of confined air in the system any fluid pressure developed by the piston, notwithstanding fluid is trapped by valve 9, will always act against a yieldable medium and no extremely high pressures can be immediately developed as the packing cup passes the porthole.

In Figure 3 the body of confined air is shown as being embodied in the system at a point forwardly of the valve mechanism at the outlet port of the master cylinder device. The air chamber is formed by a hollow rubber member 33 circular in form with its walls concave in order to permit ready collapsing as hydraulic pressure is developed. The rubber member is positioned in a sealed chamber 34 which is connected to the hydraulic system by a conduit 35. The member forming chamber 34 is shown as threaded into the end of the master cylinder but it may be connected to conduit 2 if desired. With the body of confined air forwardly of the outlet port valve mechanism, the system will function in the manner already described to prevent damage to the cup. It will also have the additional function of facilitating the maintenance of the slight positive pressure in conduits 2, 3, and 4 and the fluid motors 5 when the system is inoperative. When no body of confined air is embodied in the system forwardly of the valve means at the outlet of the master cylinder device, any small leakage of liquid at the valve will cause a quick drop of the maintained pressure. With the body of confined air present a larger volume of liquid must leak past the valve before the pressure will drop to atmospheric pressure because as leakage takes place the body of confined air (now under superatmospheric pressure) will expand and thus continue to apply pressure to the liquid although said pressure will be at a diminished value.

The body of confined air need not be within a completely hollow member such as the rubber members shown in Figures 2 and 3. It may be the air in the cells of a cellular rubber body 36 which has been so provided with a cover 37 of rubber that air cannot leak from the cells. When this body is positioned in the system and is acted upon by the hydraulic fluid under pressure, the functioning of the system will be the same as already described.

The body of confined air is shown by way of example as associated with a hydraulic pressure system in which a master cylinder having a compensating port is employed as a pressure developing means. It is, of course, obvious that it can be embodied in any hydraulic pressure system whether of the closed or open type. In either of these systems and regardless of the kind of pressure developing device used, it is very beneficial in providing a cushioning means to prevent shocks to the system by rapid pressure build-ups resulting from, for example, heavy actuating forces or "blows" on the pressure developing piston.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a hydraulic pressure actuating system, a master cylinder device comprising a cylinder, a piston, a piston packing cup formed with a lip and a liquid containing reservoir connected to the cylinder by a porthole positioned just forwardly of the lip of the cup when the piston is in its inoperative position, a motor, conduit means connecting the cylinder with the motor, a liquid in the reservoir, cylinder, conduit means and motor, and a volume of compressible fluid confined within a sealed enclosure having a yieldable wall subjected to liquid under pressure developed by actuation of the piston and movement of the packing cup past the porthole.

2. In a hydraulic pressure actuating system, a master cylinder device comprising a cylinder, a piston, a piston packing cup formed with a lip and a liquid containing reservoir connected to the cylinder by a porthole positioned just forwardly of the lip of the cup when the piston is in its inoperative position, a motor, conduit means connecting the cylinder with the motor, a liquid in the reservoir, cylinder, conduit means and motor, valve means associated with the conduit means for trapping liquid under pressure in the motor after the piston of the master cylinder device has been actuated and then released, and a volume of compressible fluid confined within a sealed enclosure having a yieldable wall subjected to liquid under pressure developed by actuation of the piston and movement of the packing cup past the porthole, said confined compressible fluid being so associated with the system that liquid under pressure trapped by the valve means will not act on the fluid to compress it.

3. In a hydraulic pressure actuating system, a master cylinder device comprising a cylinder, a piston, a piston packing cup formed with a lip and a liquid containing reservoir connected to the cylinder by a porthole positioned just forwardly of the lip of the cup when the piston is in its inoperative position, a motor, conduit means connecting an outlet of the cylinder with the motor, a liquid in the reservoir, cylinder, conduit means and motor, valve means associated with the outlet for permitting fluid to flow therethrough in both directions but maintaining the liquid in the motor under slight super-atmospheric pressure after the piston has been actuated to develop pressure and then retracted, and a volume of compressible fluid confined within a sealed enclosure having a yieldable wall subjected to the liquid under pressure which is between the valve means and the motor and is developed by actuation of the piston and movement of the packing cup past the porthole.

4. In a hydraulic pressure actuating system, a master cylinder device comprising a cylinder, a piston, a piston packing cup formed with a lip and a liquid containing reservoir connected to the cylinder by a porthole positioned just forwardly of the lip of the cup when the piston is in its inoperative position, a motor, conduit means connecting the cylinder with the motor, liquid in the reservoir, cylinder, conduit means and motor, a sealed chamber having a yieldable wall contacted by the liquid in the system between the piston and motor, and air in the chamber under atmospheric pressure when the piston is in its operative position.

5. In a hydraulic pressure actuating system, a master cylinder device comprising a cylinder, a piston, a piston packing cup formed with a lip and a liquid containing reservoir connected to the cylinder by a porthole positioned just forwardly of the lip of the cup when the piston is in its inoperative position, a motor, conduit means connecting the outlet of the cylinder with the motor, liquid in the reservoir, cylinder, conduit means and motor, a sealed annular chamber positioned in the cylinder in surrounding relation to its outlet and having a yieldable wall contacted by the liquid pressure developed by actuation of the piston, and air in the chamber under atmospheric pressure when the piston is in its inoperative position.

6. In a hydraulic pressure actuating system, a master cylinder device comprising a cylinder, a piston, a piston packing cup formed with a lip and a liquid containing reservoir connected to the cylinder by a porthole positioned just forwardly of the lip of the cup when the piston is in its inoperative position, a motor, conduit means connecting the cylinder with the motor, liquid in the reservoir, cylinder, conduit means and motor, and a body of cellular rubber provided with a sealing cover positioned in the system so that at least a part of its surface is subject to liquid pressure developed by actuation of the piston.

7. In a hydraulic pressure system, an actuating motor, a hydraulic pressure developing means, a continuous liquid column between the developing means and the motor and to which the developing means applies pressure, and a body of compressible fluid confined within a sealed enclosure having a yieldable wall subject at all times to liquid pressure developed by the developing means and effective in the motor, said compressible fluid having a predetermined volume and being at atmospheric pressure when the liquid column is at atmospheric pressure.

8. In a hydraulic pressure system, an actuating motor, a hydraulic pressure developing means comprising a movable member, a liquid column between the developing means and the motor and upon which the movable member can act, and means establishing a compressible medium upon which the the liquid column can act to thereby permit the movable member to have greater initial movement to create a predetermined liquid pressure than would be required if no compressible medium were not present, said compressible medium comprising a body of compressible fluid confined in a sealed enclosure and having a yieldable wall subject to liquid pressure developed by the movable member, said fluid being at atmospheric pressure and having a predetermined volume when the liquid column is at atmospheric pressure.

9. In a hydraulic pressure actuating system, a master cylinder device comprising a cylinder, a piston, a piston packing cup and a liquid containing reservoir communicating with the cylinder, means including the packing cup for permitting said communication when the piston is in its inoperative position, said means being so arranged that pressure developed by actuation of the piston will act on the cup and tend to cause damage thereto, a motor, conduit means connecting the cylinder with the motor, a liquid in the reservoir, cylinder, conduit means and motor, and a volume of compressible fluid confined within a sealed enclosure having a yieldable wall subjected to liquid under pressure developed by actuation of the piston to thereby cause lower liquid pressure at the beginning of the piston movement than would be present if the liquid could not act on said yieldable wall.

10. In a hydraulic pressure actuating system, a master cylinder device comprising a cylinder, a piston, a piston packing cup and a liquid containing reservoir connected to the cylinder by porthole means positioned just forwardly of the cup when the piston is in its inoperative position, a motor, conduit means connecting the cylinder with the motor, a liquid in the reservoir, cylinder, conduit means and motor, and a volume of compressible fluid confined within a sealed enclosure having a yieldable wall subjected to liquid under pressure developed by actuation of the piston and movement of the packing cup past the porthole means.

BURNS DICK.